United States Patent [19]
Tomagou et al.

[11] Patent Number: 5,097,003
[45] Date of Patent: Mar. 17, 1992

[54] PROCESS FOR PRODUCING POLYPHENYLENE SULFIDE KETONE POLYMERS

[75] Inventors: Satoshi Tomagou; Toshikazu Kato; Kensuke Ogawara, all of Mie, Japan

[73] Assignee: Tosoh Corporation, Yamaguchi, Japan

[21] Appl. No.: 363,573

[22] Filed: Jun. 7, 1989

[30] Foreign Application Priority Data

Jun. 7, 1988 [JP] Japan .................. 63-138460
Jun. 10, 1988 [JP] Japan .................. 63-141612

[51] Int. Cl.$^5$ .......................... C08G 2/00; C08G 4/00
[52] U.S. Cl. ........................................ 528/226
[58] Field of Search ........................... 528/226

[56] References Cited

U.S. PATENT DOCUMENTS 3,819,582  6/1974  Feasey .
4,590,104  5/1986  Zeiner et al. .
4,716,212  12/1987  Gaughan .

FOREIGN PATENT DOCUMENTS 0287009  10/1988  European Pat. Off. .
60-58435  4/1985  Japan .
62-285922  12/1987  Japan .
64-45465  2/1989  Japan .

OTHER PUBLICATIONS

Indian J. Chem. vol. 21, p. 501 (1981), D. Mukherjee et al.

Primary Examiner—Morton Foelak
Attorney, Agent, or Firm—Sughrue, Mion, Zinn, Macpeak & Seas

[57] ABSTRACT

A process for producing a polyphenylene sulfide ketone polymer comprising reacting a dihalogen compound of the general formula

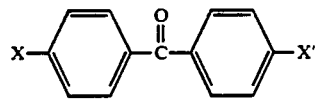

wherein X and X', which may be the same or different, each represents a fluorine, chlorine, bromine or iodine atom, with an alkali metal sulfide in a polar solvent in such a way that the alkali metal sulfide is not deprived of free water or the water of hydration in the polar solvent before polymerization is started, and that the reaction is performed at a temperature in the range of from 80° to 170° C. in the initial period of polymerization until the percentage of residual unreacted dihalogen compound is reduced to 2% or below, with the subsequent reaction being performed at a temperature in the range of from 200° to 345° C.

12 Claims, 1 Drawing Sheet

PROCESS FOR PRODUCING POLYPHENYLENE SULFIDE KETONE POLYMERS

FIELD OF THE INVENTION

The present invention relates to a process for producing thermally stable polyphenylene sulfide ketone polymers. The polymers produced by the process of the present invention are thermoplastic and exhibit high resistance to heat, flame and chemicals.

BACKGROUND OF THE INVENTION

Polyphenylene sulfide ketones (hereinafter abbreviated as PPSK) having a recurring unit represented by the general formula

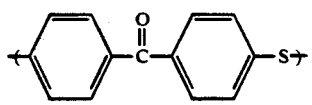

have such high heat resistance (glass transition point, 137° C.; crystal melting point, 352° C.) that they are anticipated to find utility in a broad range of applications including the electric, electronics and automotive industries.

Conventionally, PPSK has been synthesized from dihaloaromatic compounds and alkali metal sulfides in polar organic solvents and two processes based on this approach are described in Indian Journal of Chemistry, 21, 501 (1982) and JP-A-60-58435 (the term "JP-A" as used herein means an "unexamined published Japanese patent application"). In the process described in the former reference, the polymerization temperature is as low as 170° to 180° C. and the reaction is performed by one-stage heating. Thus, the resulting polymer has only a low solution viscosity of 0.26 ($H_2SO_4$, 0.5 g/dl, 28° C.). In the process described in JP-A-60-38435, the alkali metal sulfide is deprived of free water or the water of hydration by heating in a polar organic solvent and the reaction mixture is further polymerized by two-stage heating. In spite of this refined approach, the resulting polymer has low melting point and the part formed from it is very brittle.

U.S. Pat. No. 4,716,212 describes a process in which PPSK of high molecular weight is produced by adding sodium hydroxide and a slight excess of sodium hydrosulfide to the system. According to the Examples given therein, however, a heat treatment conducted at 316° C. for 120 minutes in an air atmosphere rendered the reaction product insoluble in concentrated sulfuric acid. This phenomenon suggests the occurrence of a marked structural change due to a crosslinking reaction, which led to low thermal stability of the polymer.

Because of its crystalline nature and high melting point, PPSK needs a high processing temperature and whether it is thermally stable or not presents an important problem in its shaping. However, no review has been made on the thermal stability of PPSK.

To fill this gap, the present inventors have made extensive and intensive studies and found that PPSK having better thermal stability than those produced by known processes could be obtained by improving the conditions of polymerization in the following way: an alkali metal sulfide used as a reactant is not deprived of free water or the water of hydration by heating, and reaction is performed at low temperatures in the initial period of polymerization until the percentage of residual unreacted dihalogen compound is reduced to 2% or below. The present invention has been accomplished on the basis of this finding.

SUMMARY OF THE INVENTION

An object, therefore, of the present invention is to provide a process for producing a polyphenylene sulfide ketone polymer comprising reacting a dihalogen compound of the general formula

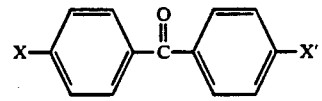

wherein X and X', which may be the same or different, each represents a fluorine, chlorine, bromine or iodine atom, with an alkali metal sulfide in a polar solvent in such a way that the alkali metal sulfide is not deprived of free water or the water of hydration in the polar solvent before polymerization is started, and that the reaction is performed at a temperature in the range of from 80° to 170° C. in the initial period of polymerization until the percentage of residual unreacted dihalogen compound is reduced to 2% or below, with the subsequent reaction being performed at a temperature in the range of from 200° to 345° C.

BRIEF DESCRIPTION OF THE DRAWING

The accompanying Figure shows the IR spectrum of the PPSK produced in Example 2 of the present invention.

DETAILED DESCRIPTION OF THE INVENTION

Figure 1:
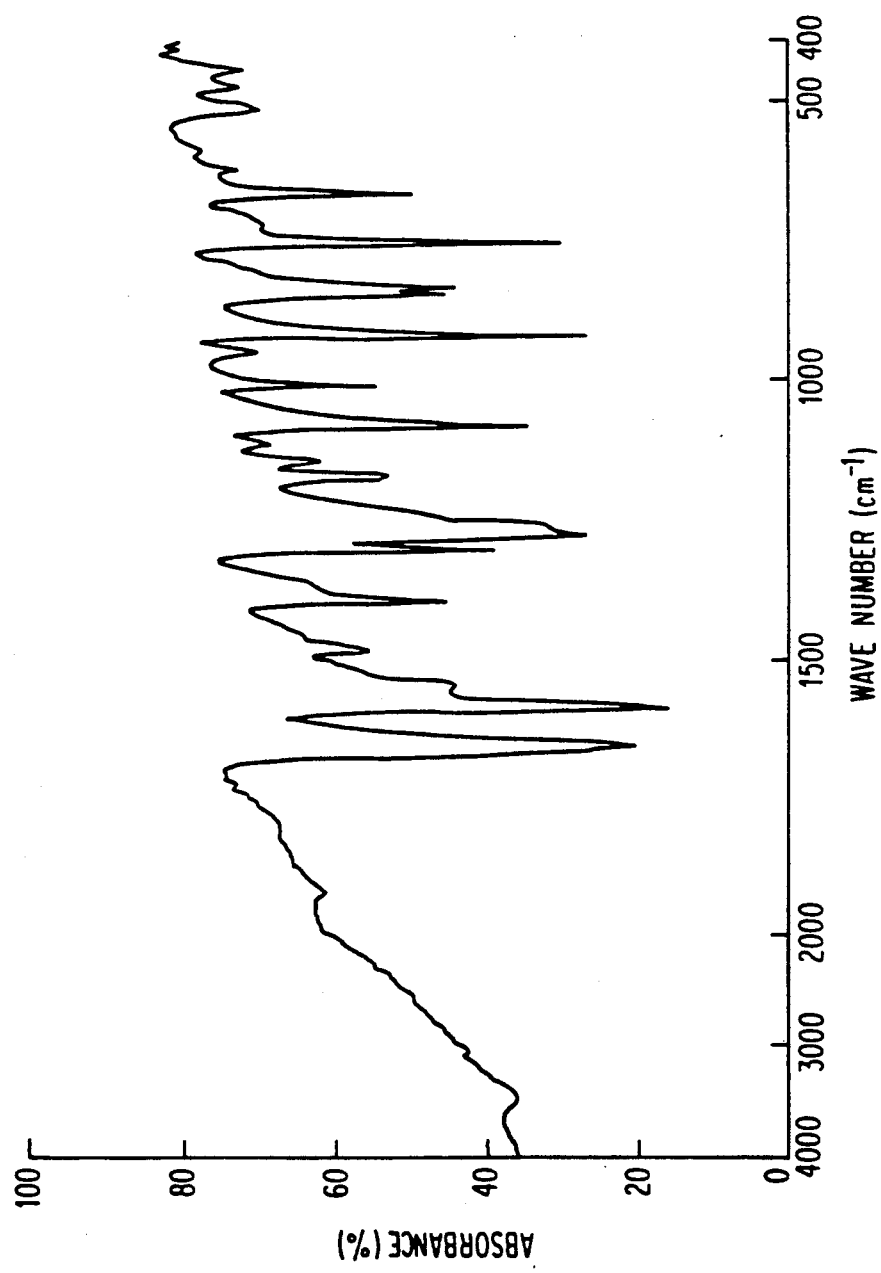

Examples of the dihalogen compound that may be used in the present invention include 4,4'-difluorobenzophenone, 4,4'-dichlorobenzophenone, 4,4'-dibromobenzophenone and 4,4'-diiodobenzophenone. From the viewpoint of thermal resistance, it is preferred that these compounds are entirely composed of linkages on the para-position but in order t improve the solubility and formability of the resulting sulfide ketone polymers, linkages on the meta- and/or ortho-position may be introduced. To this end, the compounds listed above may be copolymerized with less than 30 mol %, preferably less than 10 mol %, of monomers such as 2,4'-difluorobenzophenone, 3,3'-difluorobenzophenone, 3,4'-difluorobenzophenone, 2,4'-dichlorobenzophenone, 3,3'-dichlorobenzophenone, 3,4'-dichlorobenzophenone, 2,4'-dibromobenzophenone, 3,3'-dibromobenzophenone and 3,4'-dibromobenzophenone.

Other components that may be copolymerized in amounts of less than 30 mol %, preferably less than 10 mol %, of the recurring unit include a para linkage

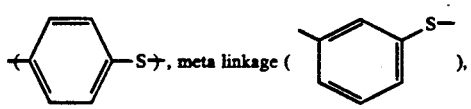

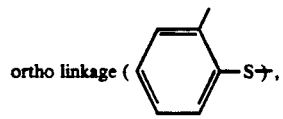

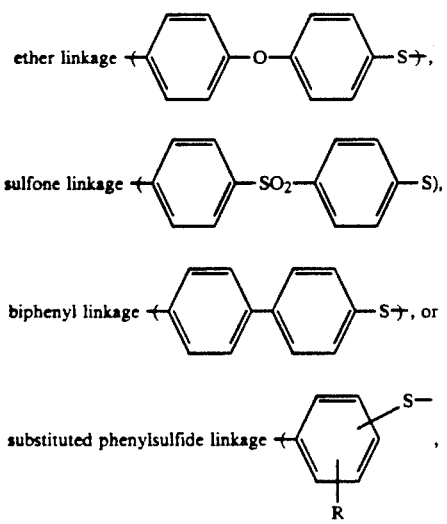

where R is an alkyl group, a phenyl group, an alkoxy group, an amino group, a cyano group, a carboxylic acid group, or a metal salt of a carboxylic acid group), and a trifunctional linkage

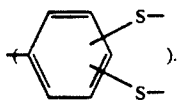

These components may be incorporated as long as their content will not cause substantial effects on the crystallinity of the resulting polymer.

The organic polar solvents that are preferred for use in the present invention are those which are aprotic and stable to alkalis at high temperatures. Illustrative examples are N,N-dimethylacetamide (DMA), N-ethyl-2-pyrrolidone, hexamethylphosphoric triamide (HMPA), dimethyl sulfoxide (DMSO), N-methyl-2-pyrrolidone (NMP), and 1,3-dimethylimidazolidinone.

Exemplary alkali metal sulfides that may be used in the present invention include lithium sulfide, sodium sulfide, potassium sulfide, cesium sulfide and mixtures thereof. These alkali metal sulfides may be used either in an anhydrous state or in the form of a hydrate (0.5 to 10 molar equivalents). Of these alkali metal sulfides, sodium sulfide is the least expensive and hence is preferred for industrial purposes.

The alkali metal sulfides described above may be prepared in situ in the polymerization system prior to the addition of a dihalogen compound. Alternatively, they may be added to the polymerization system after being prepared outside of the system.

During polymerization, crown ether compounds known as phase transfer catalysts, phosphate or ammonium salt compounds, or aids such as alkali metal carboxylates may be used and this is sometimes effective for the purpose of increasing the molecular weight of the resulting polymer.

In the process of the present invention, free water or the water of hydration is not removed from the alkali metal sulfide by heating before polymerization is started and this is effective in improving the thermal stability of the resulting polymer. Although the exact reason for this effectiveness is not clear, it may be postulated that decomposition of the alkali metal sulfide due to thermal history is prevented to inhibit the occurrence of deviations in the molar equivalent ratio and side reactions.

Polymerization is performed at a temperature in the range of from 80° to 170° C. in its initial period until the percentage of residual unreacted dihalogen compound is reduced to 2% or below. In the subsequent period, polymerization is performed at a temperature in the range of from 200° to 345° C., preferably from 230° to 280° C., so as to complete the reaction. The polymerization is continued for a total period of from 0.5 to 24 hours, preferably from 1 to 12 hours, under stirring.

The molar ratio of a dihalogen compound to an alkali metal sulfide, both of which are to be used in the present invention, is preferably within the range of from 0.9/1.0 to 1.1/1.0. A solvent may be used with its amount adjusted in such a way that the polymer produced during polymerization will account for from 5 to 50 wt %, preferably from 5 to 30 wt %, of the system.

The polymer produced may be recovered by any known method such as vacuum distillation, flash distillation, filtration or reprecipitation with water or an organic solvent. The isolated polymer may be subsequently washed with water or an organic solvent and then dried.

If the polyphenylene sulfide ketone produced in the present invention is further heated in an oxygen atmosphere, phenomena such as chain extension, cross-linking and branching will occur, and at the same time, the thermal stability of the polymer can be further improved. The heat treatment is generally performed for from 1 to 24 hours, preferably from 1 to 12 hours, at a temperature which is from 20° to 80° C. lower than the melting point of the polymer. If the treating temperature is more than 80° C. below the melting point of the polymer, the polymer will not be stabilized to the intended extent by the heat treatment. Specific examples of the oxygen atmosphere include pure oxygen, oxygen-containing gases, and air. It is also unclear why the heat treatment in an oxygen atmosphere is effective in improving the thermal stability of the polymer but a plausible explanation is that the active terminals that are left unreacted in the polymerization become inactivated by oxidation.

In the process described in U.S. Pat. No. 4,716,212, the polymer becomes insoluble in concentrated sulfuric acid upon heat treatment but this problem does not occur in the present invention and it was established that the resin produced by the process of the present invention remained soluble even when it was heat treated at 320° C. for 8 hours.

The polyphenylene sulfide ketone polymer of the present invention generally has a reduced viscosity of from 0.10 to 2.00 as measured at 30° C. in concentrated sulfuric acid at a concentration of 0.5 g/dl. If the reduced viscosity of the polymer is less than 0.10, a very brittle part will form upon forming.

The thermally stable polyphenylene sulfide ketone polymer produced by the present invention may optionally be compounded with various additives including: reinforcing fillers such as glass fibers, carbon fibers, ceramic fibers (e.g., alumina fibers), aramid fibers, wholly aromatic polyester fibers, metal fibers and potassium titanate whiskers; inorganic fillers such as calcium carbonate, mica, talc, silica, barium sulfate, calcium sulfate, kaolin, clay, pyrophyllite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxide, molybdenum disulfide, graphite, gypsum, glass beads, glass powder, glass balloons, quartz and quartz glass; as well as organic and inorganic pigments.

Other additives that may be incorporated in the polymer as required are: release or parting agents such as aromatic hydroxy derivatives; coupling agents including silane- and titanate-based compounds; as well as lubricants, heat stabilizers, weathering agents, crystal nucleating agents, foaming agents, rust inhibitors, ion trapping agents, flame retardants, flame retardant aids, etc.

If necessary, the following homopolymers and copolymers may be added either on their own or as admixtures: homopolymers including polyethylene, polybutadiene, polyisoprene, polychloroprene, polystyrene, polybutene, poly-α-methylstyrene, polyvinyl acetate, polyvinyl chloride, polyacrylic esters, polymethacrylic esters, polyacrlonitrile, polyamides such as nylon-6, nylon-6,6, nylon-6,10, nylon-12, nylon-11 and nylon-4,6, polyesters such as polyethylene terephthalate, polybutylene terephthalate and polyarylates, polyurethanes, polyacetals, polycarbonates, polyphenylene oxides, polyphenylene sulfides, polyphenylene sulfide sulfones, polysulfones, polyether sulfones, polyaryl sulfones, polyether ketones, polyetherether ketones, polyimides, polyamide-imides, silicone resins, phenoxy resins and fluorine resins; and random, block and graft copolymers of these polymers.

The following examples are provided for the purpose of further illustrating the present invention but are in no way to be taken as limiting.

It is difficult to determine the average molecular weight of the PPSK produced by the process of the present invention because it dissolves only in a special solvent such as concentrated sulfuric acid but does not dissolve in ordinary organic solvents. Hence, the reduced viscosity and melt viscosity of the PPSK are used as measures of its molecular weight. The reduced viscosity [η] is calculated by the following equation: [η]=(relative viscosity-1)/polymer concentration, where relative viscosity is measured at 30° C. in concentrated sulfuric acid at a concentration of 0.5 g/dl. Melt viscosity if measured at 365° C. with a Koka type flow tester (produce of Shimadzu Corporation; die diameter, 0.5 mm; die length, 2 mm; load, 10 kg).

Evaluation of thermal stability was also conducted with a Koka type flow tester by measuring the time-dependent changes that occurred in the melt viscosity of PPSK when it was heated for 5, 15 and 30 minutes at 380° C. (melting point+30° C.). The die diameter, die length and load were 0.5 mm, 2 mm and 50 kg, respectively.

The residual amount of unreacted dihalogen compound was determined with a gas chromatograph GC-12A of Shimadzu Corporation (detector, FID; column packed with 2% Silicone OV-17).

EXAMPLE 1

An autoclave (inner capacity, 15 l) equipped with a stirrer was charged with 7.00 l of N-methyl-2-pyrrolidone, 678 g (5.26 mols) of sodium sulfide hydrate (content of Na$_2$S, 60.4 wt %) and 1,331 g (5.36 mols) of 4,4'-dichlorobenzophenone, and reaction was performed under stirring first at 150° C. for 3 hours, then at 260° C. for 3 hours. The residual amount of unreacted dihalogen compound was 1.02% after completion of the first stage of reaction, and 0.21% upon completion of the second stage of reaction.

After completion of the reaction, the mixture was cooled to room temperature and filtered with a centrifugal separator to separate the polymer from the filtrate. The polymer was washed with water (7 l) at 180° C. and filtered with a centrifugal separator to separate the polymer from water.

In the next step, the polymer was dried overnight at 100° C. to obtain PPSK in an amount of 1,070 g (yield, 96%). By DSC (differential scanning colorimetry), this polymer was found to have a melting point of 350° C. and a glass transition point of 137° C. The reduced viscosity [η] of the polymer was 0.48 (H$_2$SO$_4$, 0.5 g/dl, 30° C.). The polymer was found to have a melt viscosity of 92 Pa.s at 365° C. as measured with a Koka type flow tester.

The PPSK was heated at 380° C. for 5 and 15 minutes and the resulting changes in the melt viscosity were measured. The results are shown in Table 1.

COMPARATIVE EXAMPLE 1

PPSK was synthesized after removing the water of hydration from sodium sulfide by heating in accordance with the Example described in the specification of JP-A-60-58435.

An autoclave (inner capacity, 15 l) equipped with a stirrer was charged with 841 g (12.01 mols) of lithium acetate, 6.00 l of N-methyl-2-pyrrolidone and 2,885 g (12.01 mols) of Na$_2$S·9H$_2$O, and the charged mixture was dehydrated by heating at 200° C. in a nitrogen stream. A distillate predominantly composed of water was obtained in an amount of 1,680 g. After cooling the reaction system to 120° C., 3,016 g (12.01 mols) of 4,4'-dichlorobenzophenone and 1.00 l of N-methyl-2-pyrrolidone were added and reaction was performed under stirring first at 230° C. for 2 hours, then at 250° C. for 1 hour.

The cooled reaction mixture was poured into water, subjected to repeated washing with water and acetone, and finally dried at 100° C. to obtain a polymer powder in an amount of 1,016 g (yield, 91%). The polymer had a reduced viscosity [η] of 0.36 (H$_2$SO$_4$, 0.5 g/dl, 30° C.) and a melt viscosity of 52 Pa.s (365° C.).

The PPSK was heated at 380° C. for 5 and 15 minutes and the resulting changes in the melt viscosity were measured. However, measurement was impossible for the heating period of 15 minutes since a curing reaction proceeded with the polymer being in a molten state. The results are shown in Table 1.

COMPARATIVE EXAMPLE 2

PPSK was synthesized in an amount of 1,061 g (yield, 95%) by repeating the procedures of Example 1 except that polymerization was accomplished by one-stage heating at 260° C. for 3 hours. When the heating temperature reached 170° C. in the process of reaction, the residual amount of unreacted dihalogen compound was 3.50%, which dropped to 0.24% upon completion of the reaction. The PPSK had a reduced viscosity [η] of 0.24 (H$_2$SO$_4$, 0.5 g/dl, 30° C.) and a melt viscosity of 22 Pa.s (365° C.). The PPSK was heated at 380° C. for 5 and 15 minutes and the resulting changes in the melt viscosity were measured. In the 15-min heating, curing reaction proceeded, causing a pronounced increase in the melt viscosity of the polymer. The results are shown in Table 1.

COMPARATIVE EXAMPLE 3

PPSK was synthesized in an amount of 1,095 g (yield, 98%) by repeating the procedures of Example 1 except that polymerization was performed by heating first at 200° C. for 3 hours, then at 260° C. for 3 hours. The residual amount of unreacted dihalogen compound was 0.66% after completion of the first stage of reaction, and 0.15% upon completion of the second stage of reaction.

The resulting polymer had a reduced viscosity [$\eta$] of 0.25 (H$_2$SO$_4$, 0.5 g/dl, 30° C.) and a melt viscosity of 18 Pa.s (365° C.).

The time-dependent changes that occurred in the melt viscosity of this polymer by heating at 380° C. were measured and the results are shown in Table 1, from which one can see that the increase in melt viscosity from the 5-min value to the 15-min value was greater than in Example 1.

TABLE 1

| Example No. | Melt viscosity[*1] (Pa · s) at 380° C. | | |
|---|---|---|---|
| | 5 min | 15 min | $\eta2/\eta1$[*2] |
| Example 1 | 32 | 46 | 1.4 |
| Comparative Example 1 | 25 | N.A. (polymer cured) | — |
| Comparative Example 2 | 10 | 1,090 | 109 |
| Comparative Example 3 | 12 | 48 | 4.0 |

[*1]Die size, 0.5 mm$^\phi$ × 2.0 mm$^L$: load, 50 kgf
[*2]$\eta1$, melt viscosity after 5-min heating at 380° C.
$\eta2$, melt viscosity after 15-min heating at 380° C.

EXAMPLE 2

The PPSK prepared in Example 1 was heat-treated in an oven at 320° C. for 8 hours in an air atmosphere. The melt viscosity of the polymer rose to 263 Pa.s (365° C.) upon heat treatment. The polymer was further heated at 380° C. for 5 and 30 minutes to check the time-dependent change in its melt viscosity. The result was satisfactory as shown in Table 2.

The PPSK synthesized in Example 2 was soluble in concentrated sulfuric acid and this was in sharp contrast with the disclosure in U.S. Pat. No. 4,716,212. The reduced viscosity [$\eta$] of this polymer was 0.52 (H$_2$SO$_4$, 0.5 g/dl, 30° C.). The thermally stable PPSK prepared in Example 2 was injection-moldable after compounding. A molded part of the polymer containing 30% of glass fibers (in the chopped strand form) had the mechanical characteristics shown in Table 3.

The polymer had the IR absorption spectrum shown in the accompanying Figure. Since it had two characteristic absorption peaks, one due to the thioether linkage (ca. 1090 cm$^{-1}$) and the other due to the carbonyl group (ca. 1640 cm$^{-1}$), the polymer was found to have the recurring unit

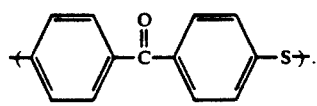

REFERENTIAL EXAMPLE 1

The PPSK prepared in Example 2 was immediately heated at 380° C. for 5 and 30 minutes and the resulting changes in melt viscosity were measured. The results are shown in Table 2.

REFERENTIAL EXAMPLE 2

The PPSK prepared in Example 2 was heat-treated in an oven at 320° C. for 8 hours under vacuum. The polymer had a reduced viscosity [$\eta$] of 0.49 (H$_2$SO$_4$, 0.5 g/dl, 30° C.) and a melt viscosity of 196 Pa.s (365° C.). Although the melt viscosity of the polymer increased from the initial value, it was not thermally stabilized as effectively as the polymer treated in Example 2 because it experienced a greater time-dependent change in melt viscosity upon heating at 380° C. as shown in Table 2.

COMPARATIVE EXAMPLE 4

The PPSK synthesized in Comparative Example 1 was heat-treated in an oven at 300° C. for 2 hours in an air atmosphere. The polymer cured rapidly and its melt viscosity rose to 296 Pa.s (365° C.). The polymer was also heated at 380° C. for 5 and 30 minutes and the resulting changes in melt viscosity were measured. The results are shown in Table 2. In the 30-min heating, the curing reaction proceeded while the polymer was molten, thus making viscosity measurement impossible.

COMPARATIVE EXAMPLE 5

The PPSK synthesized in Comparative Example 2 was heat-treated in an oven at 320° C. for 5 hours in an air atmosphere. The melt viscosity of the polymer rose to 347 Pa.s (365° C.) upon heat treatment. The polymer was also heated at 380° C. for 5 and 30 minutes and the resulting changes in melt viscosity were measured. The results are shown in Table 2. In the 30-min heating, a curing reaction proceeded while the polymer was molten, thus making viscosity measurement impossible.

COMPARATIVE EXAMPLE 6

The PPSK synthesized in Comparative Example 3 was heat-treated in an oven at 320° C. for 5 hours in an air atmosphere. The melt viscosity of the polymer rose to 248 Pa.s (365° C.) upon heat treatment. It had a reduced viscosity [$\eta$] of 0.32 (H$_2$SO$_4$, 0.5 g/dl, 30° C.). The polymer was also heated at 380° C. for 5 and 30 minutes and the resulting changes in melt viscosity were measured. Viscosity measurement was still possible after the 30-min heating but the increase from the value obtained by 5-min heating was greater than in Example 2.

An attempt was made to compound the polymer with 30% of glass fibers (chopped strands) as in Example 2 but this was impossible to accomplish since the die in the kneading apparatus clogged by the polymer which progressively cured with time. It is therefore clear that the value of $\eta2/\eta1$ (where $f1$ is the melt viscosity of PPSK as measured after 5-min heating at a temperature which is 30° C. higher than the melting point of PPSK, and $\eta2$ is the melt viscosity of PPSK as measured after 30-min heating at the same temperature) should be as small as possible, preferably not greater than 2.0.

TABLE 2

| Example No. | Melt viscosity[*1] (Pa · s) at 380° C. | | |
|---|---|---|---|
| | 5 min | 30 min | $\eta2/\eta1$[*2] |
| Example 2 | 78 | 112 | 1.4 |
| Referential Example 1 | 32 | 292 | 9.1 |
| Referential Example 2 | 41 | 226 | 5.8 |

TABLE 2-continued

| Example No. | Melt viscosity*1 (Pa · s) at 380° C. | | η2/η1*2 |
|---|---|---|---|
| | 5 min | 30 min | |
| Comparative Example 4 | 83 | N.A. (polymer cured) | — |
| Comparative Example 5 | 96 | N.A. (polymer cured) | — |
| Comparative Example 6 | 71 | 351 | 4.9 |

*1Die size, 0.5 mm⌀ × 2.0 mmL: load, 50 kgf
*2η1, melt viscosity after 5-min heating at 380° C.
η2, melt viscosity after 30-min heating at 380° C.

TABLE 3

| Parameter | Unit | Test method | Value |
|---|---|---|---|
| Tensile strength | kg/cm² | ASTM D-638 | 1220 |
| Bending strength | kg/cm² | ATSM D-790 | 2080 |
| Izod impact strength | | | |
| (notched) | kg · cm/cm | ASTM D-256 | 6 |
| (unnotched) | kg · cm/cm | ASTM D-256 | 16 |
| Thermal deformation temperature (18.6 kg/cm²) | °C. | ASTM D-648 | 330 |

As will be understood from the foregoing discussion, the present invention is capable of improving the thermal stability of polyphenylene sulfide ketone polymers which inherently have high resistance to heat, flame and solvents and good mechanical properties. The so improved polymers are anticipated to find utility in a broader range of applications and hence have high industrial value.

While the invention has been described in detail and with reference to specific embodiments thereof, it will be apparent to one skilled in the art that various changes and modifications can be made therein without departing from the spirit and scope thereof.

What is claimed is:

1. A process for producing a polyphenylene sulfide ketone polymer comprising reacting a dihalogen compound of the general formula

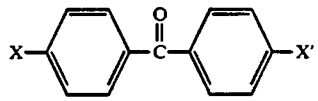

wherein X and X', which may be the same or different, each represents a fluorine, chlorine, bromine or iodine atom, with a water containing alkali metal sulfide in a polar solvent at a temperature in the range of from 80° to 170° C. in an initial period of polymerization until the percentage of residual unreacted dihalogen compound is reduced to 2% and below, with a subsequent reaction being performed at a temperature in the range of from 200° to 345° C.

2. A process as in claim 1, wherein said dihalogen compound is selected from the group consisting of 4,4'-difluorobenzophenone, 4,4'-dichlorobenzophenone, 4,4'-dibromobenzophenone, and 4,4'-diiodobenzophenone.

3. A process as in claim 1, wherein said alkali metal sulfide is at least one member selected from the group consisting of lithium sulfide, sodium sulfide, potassium sulfide, and cesium sulfide.

4. A process as in claim 3, wherein said alkali metal sulfide is sodium sulfide.

5. A process as in claim 1, wherein the molar ratio of said dihalogen compound to said alkali metal sulfide is from 0.9/1.0 to 1.1/1.0.

6. A process as in claim 1, wherein said polar organic solvent is an aprotic solvent which is stable to alkalis at high temperatures.

7. A process as in claim 6, wherein said polar organic solvent is N,N-dimethylacetamide, N-ethyl-2-pyrrolidone, hexamethylphosphoric triamide, dimethyl sulfoxide, N-methyl-2-pyrrolidone, or 1,3-dimethylimidazolidinone.

8. A process as in claim 1, wherein said polar organic solvent is used in such an amount that the amount of the polymer formed during the polymerization is from 5 to 50% by weight of the polymerization system.

9. A process as in claim 1, wherein the total polymerization time is from 0.5 to 24 hours.

10. A process as in claim 1, which further includes the step of heat treating the polymer at a temperature which is from 20° to 80° C. lower than the melting point of the polymer in an oxygen atmosphere.

11. A process as in claim 10, wherein the heat treatment is carried out for a period of from 1 to 24 hours.

12. A process as in claim 1, wherein the polymer formed has a reduced viscosity of from 0.10 to 2.00 as measured at 30° C. in concentrated sulfuric acid at a concentration of 0.5 g/dl.

* * * * *